United States Patent
Lenz

[19]

[11] Patent Number: 5,833,312
[45] Date of Patent: Nov. 10, 1998

[54] APPARATUS FOR COUNTERACTING WHIPLASH INJURIES

[75] Inventor: Thomas Lenz, Örebro, Sweden

[73] Assignee: LTG Safecontrol Automotive AB, Strangnas, Sweden

[21] Appl. No.: 776,767
[22] PCT Filed: Aug. 29, 1995
[86] PCT No.: PCT/SE95/00969
§ 371 Date: Feb. 7, 1997
§ 102(e) Date: Feb. 7, 1997
[87] PCT Pub. No.: WO96/06752
PCT Pub. Date: Mar. 7, 1996

[30] Foreign Application Priority Data
Aug. 30, 1994 [SE] Sweden .................................. 9402877

[51] Int. Cl.⁶ .................................................... B60N 2/42
[52] U.S. Cl. ............................... 297/216.13; 297/216.12; 297/216.14; 280/730.1
[58] Field of Search ........................... 297/216.1, 216.12, 297/216.13, 216.14, DIG. 3; 280/730.1

[56] References Cited
U.S. PATENT DOCUMENTS
3,172,702 3/1965 Rose .

FOREIGN PATENT DOCUMENTS
0593845 A1 4/1994 European Pat. Off. .
2206329 C2 12/1972 Germany .

*Primary Examiner*—Peter M. Cuomo
*Assistant Examiner*—Anthony D. Barfield
*Attorney, Agent, or Firm*—Larson & Taylor

[57] ABSTRACT

A protection apparatus is mounted in the seat of newly made or available vehicles of any kind for preventing or reducing so-called whiplash injuries when a person in the vehicle is thrown rearwardly in case the vehicle is run into from behind, or as a reaction of a violent movement forwardly in case of a crash with an object in front. The apparatus includes an activation device (4) for a protection apparatus mounted in the seat back (3) of the vehicle seat (2), which activation device is connected to a neck support (9) or to an equivalent, and which upon actuation of the protection apparatus forms a forwardly and preferably also upwardly expelled catcher canvas (10) for the upper part of the back, the neck and the head of the person in the vehicle seat.

18 Claims, 5 Drawing Sheets

APPARATUS FOR COUNTERACTING WHIPLASH INJURIES

FIELD OF THE INVENTION

The present invention generally relates to a protection system/apparatus which is in particular intended to be installed in newly made or available vehicles for preventing or counteracting creation of so called whiplash injuries. As known such so called whiplash injuries often appear when a vehicle is being run into or bumped from behind but also as a reaction of a violent retardation, especially depending on a crash with a vehicle in front, whereby the driver or the passenger of the car is violently thrown forwardly and is thereafter thrown back again. The ever increasing traffic intensity often causes problems with formation of vehicle queues and this has lead to a strong increase of the type of crashes in which vehicles become run into from behind. A Dutch study during the years 1983–1991 shows that bumpings from behind have increased from 3% to 30% as calculated on all crashes during said period. In Sweden bumpings from behind also amount to about 30% of all crashes, and this means that about 200 such crashes occur every day. In spite of the fact that crashes from behind generally do not happen at particularly high speeds such crashes amount to about 50% of the costs for personal injuries for the Swedish community and for the insurance companies.

BACKGROUND OF THE INVENTION

At bumpings or crashes from behind, or when the body is thrown back after a violent braking or after a front crash, the lower back of the body and the trunk of the body, and thereafter the chest are firstly thrown back, whereas the head, which is relatively heavy in relation to the remaining parts of the body, follows thereafter under a violent bow at the neck and the back of the head. This may cause serious injuries which are sometimes not immediately observed but which are observed some time after the accident has happened.

Most protection apparatus of vehicles of to-day have been developed for protecting the driver or the passengers from injuries obtained when the body is thrown forwardly depending on a crash. Rather few efforts have been made to reduce injuries on human beings obtained when a vehicle is run into from behind, or when the body is thrown back as a reaction of a violent retardation, perhaps with a following crash against an object in front.

Conventional neck or back head supports may, indeed, provide some protection against whiplash injuries, but often said back head supports are not correctly placed in relation to the head of the driver or the passenger, generally it is placed far too low, and depending on the stationary location of many such back head supports they can often not meet the violent movement rearwardly to which the head is subjected during a whiplash movement by a movement forwardly of said back head supports.

The basis of the invention therefore has been the problem of providing a system or apparatus which, as far as possible, counteracts whiplash injuries as mentioned above, in particular injuries which appear when the head of the driver or the passenger of a vehicle is violently thrown rearwardly, whether said whiplash movement appears as a result of a crash from behind or as a movement of reaction resulting from a violent retardation like from a crash with an object in front.

The Swedish patent 811525-2 having the publication number 395.929 discloses an apparatus for preventing injuries on the head and the cervical vertebras resulting from crashes, and the apparatus comprises two inflatable aid cushions which are mounted in the seat back of the vehicle seat closely underneath an available back head support. The air or gas cushions in said known apparatus are of conventional type, and they lead, among other things, to the disadvantage of being inflated so rapidly and by such a violent force, like in an actual explosion, that the very air cushion during said inflating may cause serious injuries to the driver and/or the passenger of the vehicle.

SUMMARY OF THE INVENTION

The present invention is intended to eliminate said problem and even other problems and to provide an apparatus giving a protection against whiplash injuries, which apparatus provides a calm but yet quick protection in that the apparatus is formed so as to provide, upon actuation thereof, an effective reduction of the distance between the human head and the said protection apparatus. More particularly the invention relates to such a protection means which is of automatic type and the activity of which may be solely or partly initiated by the very human body when the trunk and the thorax of the human body has just started moving rearwardly but before the human head has started being thrown rearwardly following to a violent retardation or a crash.

A protection apparatus for a vehicle, which is initiated by the very human body and which is always at hand and is readily active provides a safer, cheaper and more simple system than the pyrotechnical charges, which are actuated by electronic sensors like many protection systems which are commonly used to-day.

The most important feature in counter-acting whiplash injuries at as early stage as possible after an accident, is to minimize the distance between the back of the body, and in particular the head of the driver or the passenger and the seat back and the back head support respectively, and to provide such reduction of distance already before the upper part of the body and the head of the driver or the passenger has been thrown back, at least to any substantial extent.

It is intended that the invention is capable of being applied to and used not only in newly made vehicles but also to be mounted later on in available vehicles of any kind.

It is known, and studies with test dolls, among other accidents at crashes from behind, have proved that the body is thrown rearwardly in several stages. Firstly the lower part of the body trunk reacts and is pressed, by a heavy force, against the lower part of the seat back, thereafter the upper part of the body trunk is pressed back, and finally the back of the head and the head is thrown back against the upper part of the seat back and against the neck or back head support.

This type of movement of the human body has been studied as the basis of the present invention, and according to the invention the apparatus is formed so that the protection apparatus is mounted in the seat back such that said function of the apparatus may be initiated solely or partly by the very human body when the lower back of the body and the trunk are pressed back against the seat back, and in which the protection apparatus is firstly actuated by the trunk of the body and thereafter by the upper part of the body back, so that the back head support is successively moved forwardly and meets the back of the head and the head during their movements rearwardly.

The necessary force for activating the protection apparatus has to be carefully calculated so as to prevent un-intentional and non-needed activation. The pressure force applied by the human body against the lower part of the seat back releases a stored energy of a means, for instance in the form of a heavy spring which may expel the back head support, or any other means obliquely upwards-forwards, for instance using a bar which connects the back head support with the seat back. For preventing an askew expelling upwards of the back head support, like in a so called "drawer effect", there ought to be three bars connecting the backhead support with the seat back, one bar arranged at the center and one bar on each side thereof. The central bar is connected to, and is actuated by the means comprising the stored energy, and the two outer bars provide a guiding and a stabilizing of the expelling means.

A safety means can be mounted on the back head support or on the other means which is being expelled upwards-forwards, for instance a canvas of a material which can stand the strong stresses which may appear when the human body and the head of the human body are thrown rearwardly. The canvas preferably is secured, with the lower part thereof, at the lowermost part of the seat back and it is normally relatively loosely tightened. The canvas is tightened when the back head support is forced upwards-forwards, and it is thereby being formed as a catcher of the upper part of the back of the body, and in particular of the back head and the head of the driver or the passenger.

In order to increase or speed up the stretching of the whiplash protection canvas the said spring can be combined with a piston-cylinder unit which is activated by a slight pyrotechnical charge which explodes, initiated mechanically by an initiating means in the seat back, or electronically by a separate crash sensor, whereby the canvas is being stretched more quickly and to a stronger extent than only by the spring means.

In addition to the above mentioned spring actuation means several different alternative solutions can be presented as alternatives to arrangements in which the very human body activates the protection means in connection to a crash.

According to an alternative apparatus the seat back is formed with a cavity which is filled with air or with a gas having atmospheric pressure. Said cavity communicates, over channels, with an inflatable canvas body or a cushion which can be formed as an integral unit with the seat back or with the neck head support. When the lower back of the body is pressed violently rearwardly against the lower part of the seat back as a reaction of a crash against an object in front, or the vehicle is run into from behind the air or gas is pressed up through the channels thereby inflating the canvas body or cushion so that said body or cushion, at least to a substantial extent, fills the space between the person in the vehicle and the seat back and the neck support, and whereby the outer canvas surface of said canvas body or cushion presents a flexible catcher for the neck and the head of the person in the vehicle. The inflated canvas body or cushion thereby makes the pressure from the human body become distributed over the entire head, the neck and a part of the back of the driver or the passenger.

Also in this embodiment the mechanical whiplash protection action may be combined with a pyrotechnical assisting action in that a slight pyrotechnical charge is brought to explode inside the air cavity thereby providing a quicker and stronger inflation of the inflatable canvas body or cushion.

The spring of the former alternative dampens the action of the pyrotechnical charge, and so does the air originally existing in the seat back cavity of the above mentioned alternative, so that no seriously strong pyrotechnical effects are transmitted to the human body, in particular not to the head of the body.

BRIEF DESCRIPTION OF THE DRAWINGS

Now the invention is to be described more in detail in connection to the accompanying drawings which diagrammatically show a couple of embodiments of the invention. In the drawings

DESCRIPTION OF THE PREFERRED EMBODIMENT

Figure 1:
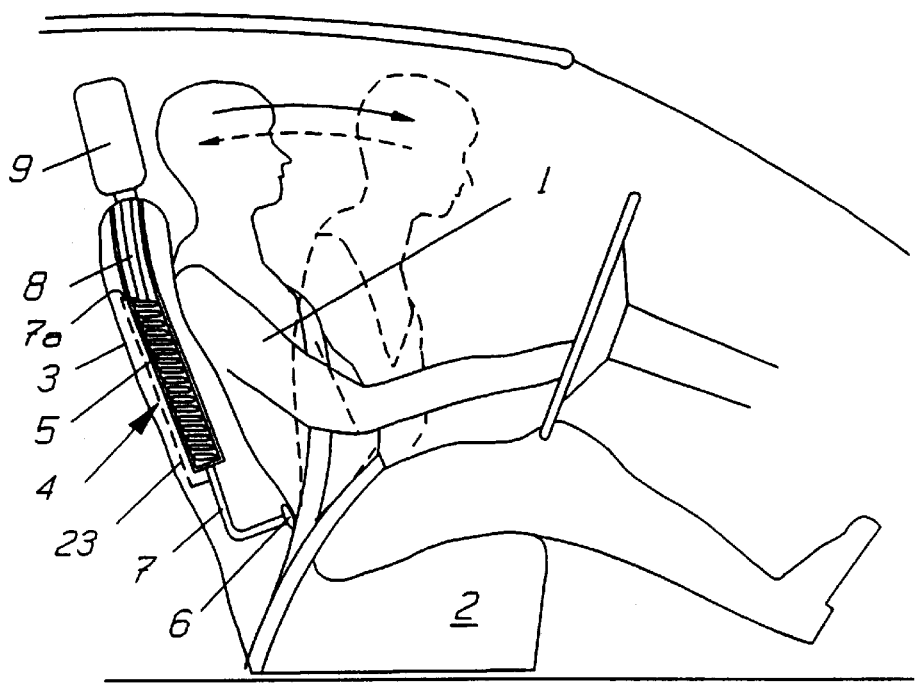
FIG. 1 shows a mechanical solution of the protection apparatus according to the invention in its non-activated rest position.
Figure 2:
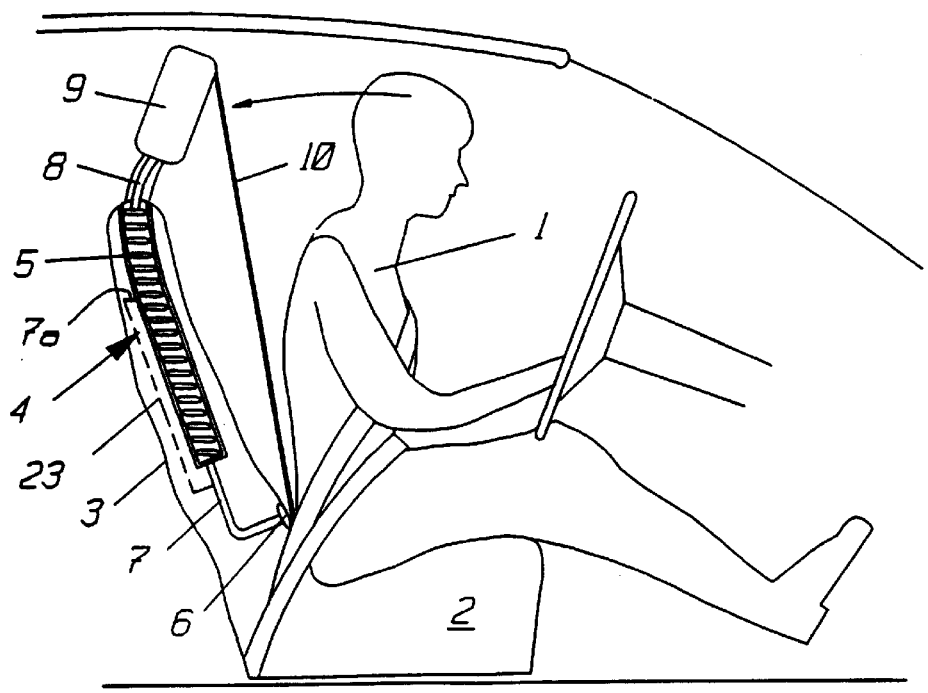
FIG. 2 shows the apparatus just after it has been activated but before the upper back, the neck and the head of the driver hits the activated catcher canvas of the protection apparatus during its movement rearwardly.

FIGS. 1 and 2 show a person 1, in this case the driver of a vehicle, who sits on a seat 2 of a vehicle, which vehicle can be of any type, for instance a vehicle for transportation at land, at sea or in the air. In the back 3 of the seat a mechanical releaser 4 for the protection apparatus is mounted, which apparatus, in the illustrated case, is a strong, pre-tensioned spring 5. At a place close to the bottom end of the seat back an activation apparatus 6 is mounted, which in its most simple form can be a link 7 which, when actuated, releases a catch 7a for the pre-tensioned spring so that the spring is being expanded, as shown in FIG. 2. At the upper end the spring is formed with a second link 8 which, in its normal condition, may carry a back head or neck support 9, or another expellable means, which in its rest position is located at or close to the upper edge of the seat back 3. Said link 8 is shaped and mounted so that the neck support, upon releasing of the pre-tensioned spring 5, is pressed upwards and concurrently therewith forwards. The second link 8 preferably consists of three arms, a central arm which is the expelling link, and two outer arms (not visible in the drawings) which guide and stabilise the neck support 9 during its movement upwards-forwards. The upper end of the neck support 9, or another expellable means, carries a first end of a protection canvas, or catcher canvas 10 of a suitable textile or plastic material, which can be at least slightly elastic, and which with its opposite, lower, end is connected to the front side of the seat back, preferably adjacent the bottom end of the seat back 3 and extends along the front side of said seat back. Alternatively, the upper end of the canvas can be connected to another means, like a bar, which is arranged to be moved upwards-forwards when the spring 5 is being released and expanded.

If the vehicle is run into from behind, or as a reaction of a frontal crash, the body of the person 1 in the vehicle is thrown back against the seat back, first with the lower back of his body and thereafter successively upwards with the trunk of the body, the back and finally with the head. The actuation apparatus 6, which is mounted far down on the seat back is thereby activated at the initial stage of the movement rearwardly of the body and via the link 7 and the spring catch 7a it releases the pre-tensioned spring 5. As a result thereof, and as shown in FIG. 2, the pre-tensioned spring 5 is being released and expanded, whereby it forces the neck support 9, or the other means connected to the upper spring link 8, upwards and forwards, whereby the catcher means, like the canvas 10 is being stretched between the neck support, or said other means, and the connection point thereof at the seat back thereby forming a substantially forwardly extended flexible, preferably at least slightly resilient counter support against which the upper part of the back, the neck and the head of the person in the vehicle are being thrown and pressed at the final stage of the movement rearwardly of the body.

Thanks to the forwardly extended position of the flexible canvas 10 the distance between the body 1 of the driver and the canvas 10 is reduced; further, since the canvas is flexible, preferably also resilient, it thereby dampens the rearward movement of the body; still further, the canvas will partly enclose the body, the neck and the head of the person thereby distributing the force from the rearwardly moving body and stopping the rearward movement of the body.

Figure 3:
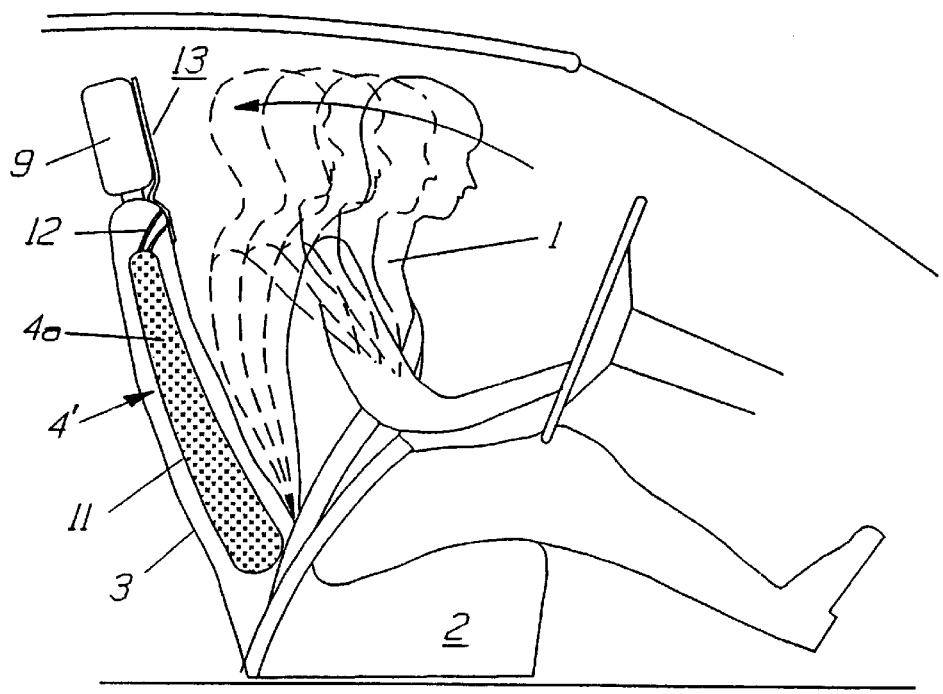
FIG. 3 correspondingly shows a pneumatic apparatus in the same situation as that of FIG. 1.
Figure 4:
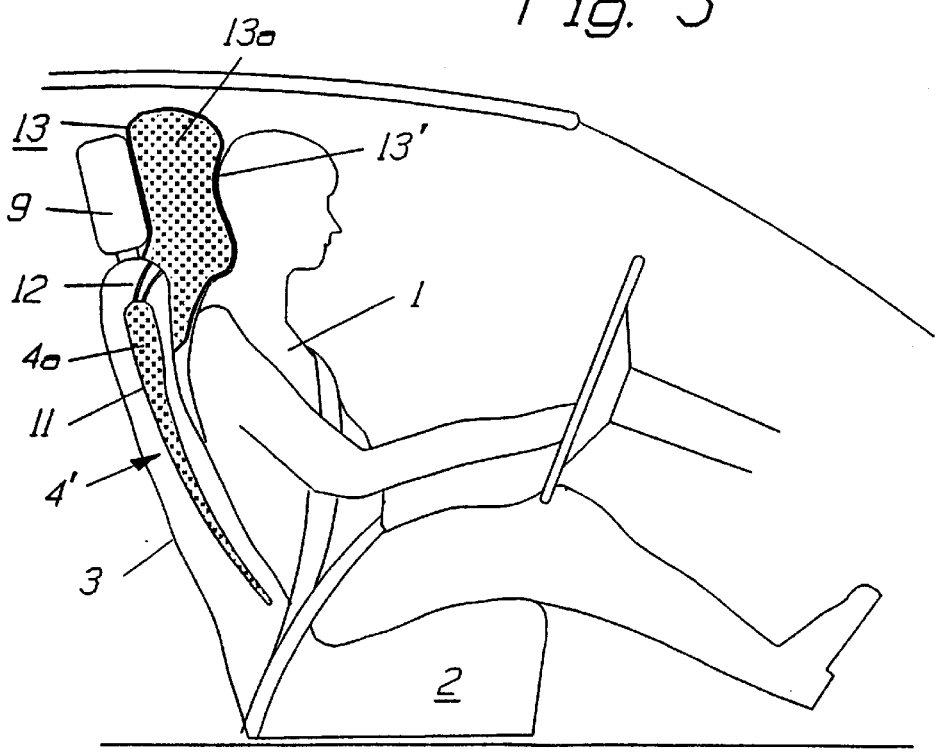
FIG. 4 shows said pneumatic apparatus in the same situation as that of FIG. 2.

The alternative embodiment of the protection apparatus 4' which is shown in FIGS. 3 and 4 is, like the previously described embodiment, mounted in the seat back 3 of the vehicle seat 2. As an alternative to the above described pre-tensioned spring the seat back 3 is, in this embodiment of the invention, formed with a closed cavity, for instance in the form of an air or gas accumulator in the form of a cushion or pocket 11 of plastic, rubber or a similar material which is filled with air or with a gas 4a, and which over passageways 12 communicates with a flexible, expandable part of a neck support, formed as a canvas pocket or a cushion 13 extending from the upper part of the neck support 9 and some distance down the seat back 3. Said expandable part 13 of the neck support has a relatively little volume in relation to the air or gas filled seat back cushion or pocket 11. In its rest position said canvas pocket 13 is empty and forms a surface covering the neck support 9 and part of the car seat back 3.

If the vehicle is run into from behind, or as a reaction of a crash against an object in front, the human body 1 is thrown rearwardly starting with lower back of the body, the trunk and thereafter the upper part of the back of the body which is thereby pressed against the seat back 3. Thereby said body compresses the air or gas filled cushion or pocket 11 so that the air thereof is pressed through the passageways 12 and into The expandable part 13, like the canvas pocket of the neck support 9.

Said neck support is thereby inflated with air 13a so as to form an upwardly and forwardly stretched flexible canvas surface 13' which meets, catches and partly encloses the neck and the head of the body 1, in the same way as the catcher canvas 10 of the mechanical alternative described above in connection to FIGS. 1 and 2. Said stretched flexible canvas surface 13' of the inflated canvas pocket 13, which may form a part of the neck support thereby dampens and retards the movement rearwardly of the neck and the head of the driver 1 in a calm and even movement, and distributes the kinetic force over a substantial canvas surface 13'.

Figure 5:
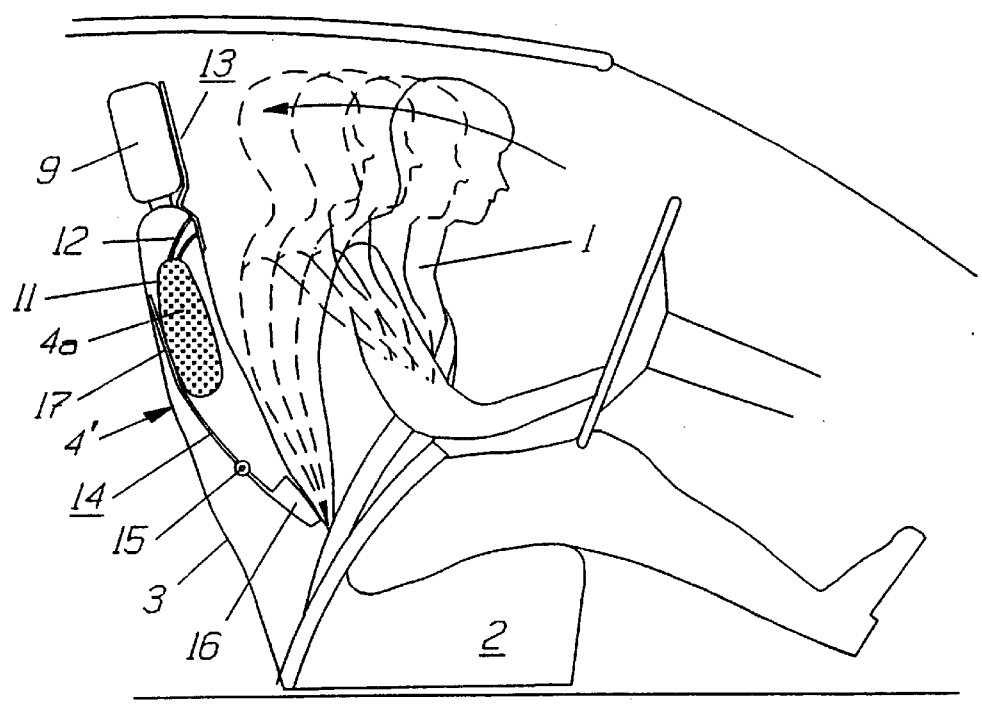
FIGS. 5 and 6 shows an alternative embodiment of the protection apparatus of FIGS. 3 and 4, having a mechanical lever used for speeding up the stretching of the canvas.
Figure 6:
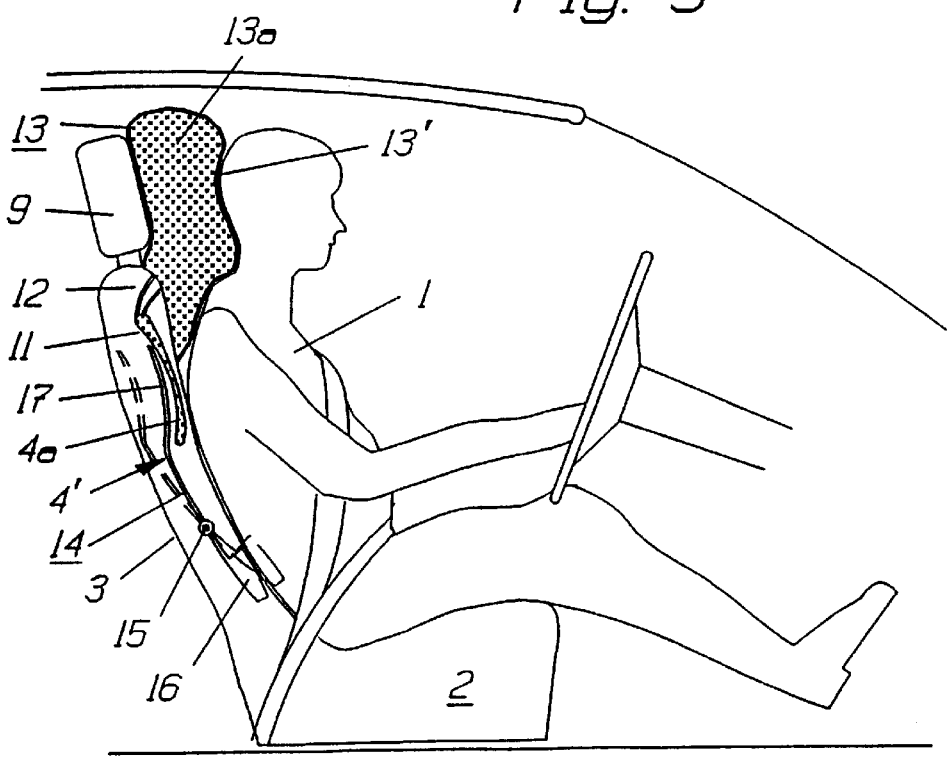

FIGS. 5 and 6 show an alternative embodiment of the pneumatical apparatus of FIGS. 3 and 4. In said alternative embodiment a lever 14 is rotatably mounted about a transversal pin 15 in the seat back. Said pin 15 is preferably arranged underneath the centre of the lever 14, so that the upper lever arm executes a larger swing movement than the lower lever arm. The lower lever arm is formed with an activator plate 16 located adjacent the bottom of the seat which is the place where the body of the driver is first moved backwards if the vehicle is run into from behind. The upper lever arm is formed as a press bar 17 in contact with the air cushion 11. In a first stage of reaction the lower back of the body of the driver 1 presses the activator plate 16 rearwards, whereby the upper lever press bar 17 compresses the air cushion 11 thereby starting filling the expandable canvas 13 before the upper back of the body completes such filling of said canvas body 13a, as shown in FIG. 6.

Figure 7:
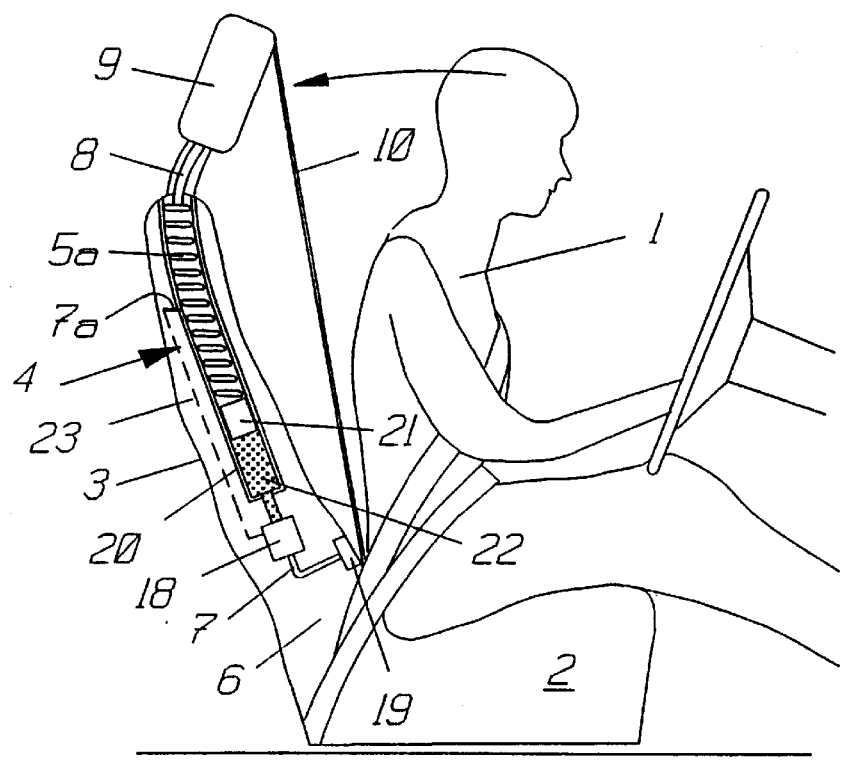
FIG. 7 is an alternative embodiment of the mechanical protection apparatus formed with an assisting pyrotechnical charge, and FIG. 8 correspondingly shows the pneumatical protection apparatus having an assisting pyrotechnical charge.
Figure 8:
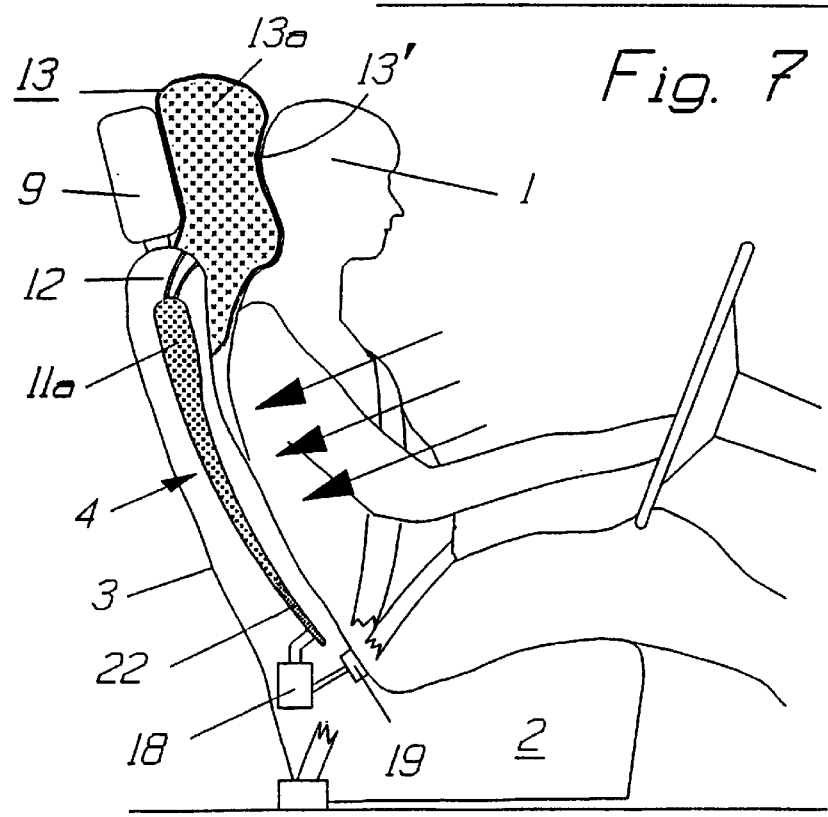

Alternatively to what is described above the mechanical and pneumatical protection means may be combined with a slight pyrotechnical charge, as shown in FIGS. 7 and 8. Such pyrotechnical charge may increase the effect of the spring 5a of FIG. 7 or the pneumatic seat cushion 11a of FIG. 8.

In FIG. 7 a slight pyrotechnical charge 18 is adapted to be initiated by a sensor 19 which can be mounted at any suitable place in the car, and which is shown adjacent the spring protection apparatus 4 is FIG. 7. The lower part of the spring holder is formed as a cylinder part 20. Between the spring 5a and the bottom of the spring cylinder 20 a piston 21 is housed in said cylinder 20. The pyrotechnical charge 18 is directly connected to the cylinder-piston unit 20, 21. When the sensor 19 indicates a violent change of movement of the vehicle, generally a violent retardation, or the driver 1 himself initiates the sensor 19 by his body moving rearwardly it releases the pyrotechnical charge 18, whereby explosion gases 22 in the cylinder 16 moves the piston 21 and the lower end of the spring 5a upwards and, concurrently therewith, releases the upper end of the spring 5a, as indicated with the dotted line 23 in FIG. 7. The neck support 9 is thereby moved upwards and slightly forwards, and this makes the canvas 10 become stretched.

FIG. 8 shows that a pyrotechnical charge 18, which is initiated by a sensor 19 gives an addition of explosion gases 22 to the air 11a inside the air accumulator 11 in the seat back 3, thereby speeding up the inflation of the canvas pocket 13 and the stretching of the flexible canvas surface 13' thereof.

Figure 9:
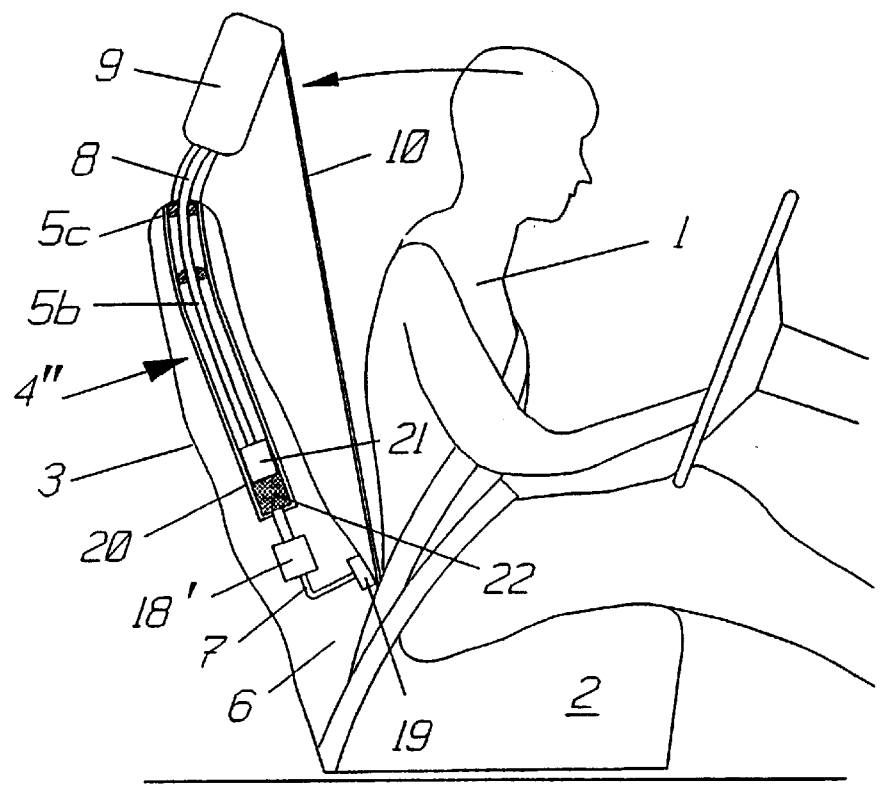
FIG. 9 is a still further embodiment showing pyrotechnical power means for activating the otherwise mechanical protection apparatus, and FIG. 10 correspondingly shows a pyrotechnical charge for stretching the otherwise pneumatical protection apparatus.

It is also possible to substitute the mechanical spring, as shown in FIGS. 1, 2 and 7 by a relatively stronger pyrotechnical charge 18' as shown in FIG. 9. In this embodiment the piston 21 is directly connected to a bar 5b which can be an extended part of the link 8. Said bar 5b may be formed with a top block 5c adapted to prevent an overstrong expelling of the neck support 9.

Figure 10:
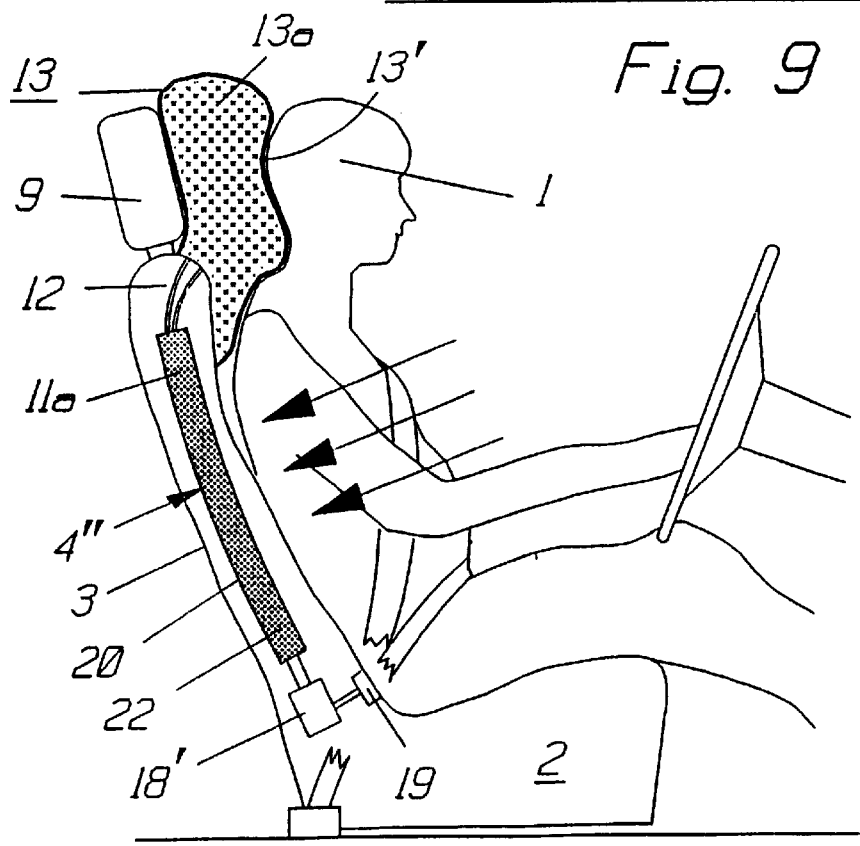

As shown in FIG. 10 it is also possible to substitute the air accumulator of FIGS. 3, 4 and 8 by a flexible or solid cylinder 20 which is directly connected between a relatively strong pyrotechnical charge 18' and the passageways 12 and the flexible canvas pocket 13. When the retardation sensor 19 indicates a violent retardation the pyrotechnical charge 18' is released and the explosion gases expand in the cylinder 20, the passageways 12 and the flexible canvas pocket 13 thereby stretching the front canvas surface 13'. In case the cylinder 20 is at least slightly flexible the body of the driver provides an addition of power of the gas body 11a when the body hits the seat back.

| Reference numerals | |
|---|---|
| 1 | human body |
| 2 | vehicle seat |
| 3 | seat back |
| 4 | protection apparatus |
| 4a | air, gas |
| 5 | spring (= 5a) |
| 5b | bar |
| 5c | top block |
| 6 | activation apparatus |
| 7 | link |
| 7a | catch |
| 8 | link |
| 9 | neck support |
| 10 | canvas |
| 11 | cushion |
| 11a | gas body |
| 12 | passageway |
| 13 | expandable part (of 9) |
| 13a | air |
| 14 | lever |
| 15 | pin |
| 16 | activator plate |
| 17 | press bar |
| 18 | pyrotechnical charge |
| 19 | sensor |
| 20 | cylinder |
| 21 | piston |
| 22 | explosion gases |
| 23 | releasing means (dotted) |

I claim:

1. A protection apparatus for reducing whiplash injuries for a person seated in a vehicle comprising:

a vehicle seat including (a) a seat back having a forward surface for engaging the person, and (b) a separate neck support extending upwardly from said seat back having a forward surface adapted to be adjacent the person;

a strong and flexible material connected to said seat so as to extend in a non-actuated configuration along said neck support and seat back from an upper end of said flexible material adjoined to the forward surface of said neck support to a lower end of said flexible material adjoined to the forward surface of said seat back;

an activation means, which is actuated when the person in the seat is thrown rearward during a whiplash inducing event and which is mounted in said seat back of the vehicle seat, for moving said flexible material from the non-actuated configuration to an actuated configuration, the actuated configuration being where said upper end of said flexible material is moved forwardly and hence stretched forwardly away from adjacent parts of the forward surfaces of said neck support and seat back to act as a resilient catcher for an upper part of a back, a neck, and a head of the person when the person is thrown rearward to reduce whiplash injuries.

2. A protection apparatus as claimed in claim 1:

wherein said activation means also moves said upper end of said flexible material upwardly as said flexible material is moved forwardly.

3. A protection apparatus as claimed in claim 1:

wherein said flexible material is an expandable pocket having a flexible front surface adjacent said neck support; and wherein said activation means includes a collapsible air accumulator which contains a gas, and a passageway from said air accumulator to said expandable pocket such that when the person is thrown rearward and is pressed into said seat back, said air accumulator is collapsed and gas in said air accumulator is forced through said passageway and into said expandable pocket to inflate said expandable pocket and hence to stretch said flexible material.

4. A protection apparatus as claimed in claim 3:

wherein said activation means further includes a pyrotechnical charge which is connected to said air accumulator, and an ignition means for igniting said charge when the person is thrown rearward such that upon ignition of said charge explosion gases are produced and transmitted through the collapsing said air accumulator to said expandable pocket thereby speeding up and increasing the stretching of said flexible material.

5. A protection apparatus as claimed in claim 4:

wherein said air accumulator is a cylinder; and wherein said ignition means is a retardation sensor.

6. A protection apparatus as claimed in claim 3:

wherein said activation means further includes a pin mounted transversely in said seat back, a lever rotatable about said pin, said lever having (a) a lower arm which ends in a plate, which said plate is located adjacent a bottom end of said seat back and (b) an upper arm which ends in a press bar, which said press bar is located adjacent said air accumulator, whereby when the person is initially thrown rearward a lower part of the back of the person is thrust into said plate causing said lever to rotate about said pin and hence for said press bar to press into said collapsible air accumulator and to start forcing gas from said air accumulator through said passageway into said expandable pocket before the upper back of the person is pressed into said seat back.

7. A protection apparatus as claimed in claim 1:

wherein said flexible material is an expandable pocket having a flexible front surface adjacent said neck support; and wherein said activation means includes a solid cylinder which contains a gas, a passageway from said cylinder to said expandable pocket, a pyrotechnical charge which is connected to said cylinder, and an ignition means for igniting said charge when the person is thrown rearward such that upon ignition of said charge explosion gases are produced and transmitted through said cylinder to said expandable pocket to inflate said expandable pocket and hence to stretch said flexible material.

8. A protection apparatus as claimed in claim 1:

wherein said lower end of said flexible material is attached to said seat back adjacent a bottom end of said seat back.

9. A protection apparatus as claimed in claim 1:

wherein said activation means includes a spring which is pre-tensioned, and a link attached at one end to said spring and at the other end to said neck support such that when said spring is released from tensioning said spring moves said link upwards which in turn moves said neck support upwardly to stretch said flexible material.

10. A protection apparatus as claimed in claim 9:

wherein said link also moves said neck support forwardly as said neck support is moved upwardly.

11. A protection apparatus as claimed in claim 9:

wherein said activation means includes an initiating means for releasing said spring from the pre-tensioning thereof, said initiating means including a second link located in a lower part of said seat back which is moved when a lower part of the back of the person is initially thrown rearward during a whiplash inducing event.

12. A protection apparatus as claimed in claim 9:

wherein said activation means further includes
 a spring cylinder in which said spring is located,
 a piston in said spring cylinder located below said spring,
 a pyrotechnical charge located below said piston, and
 a sensor which senses when the person is thrown rearward and which then ignites said charge producing explosion gases in said cylinder to drive said piston upward and to thereby speed up and increase the upward movement of said link caused by said spring.

13. A protection apparatus as claimed in claim 12:

wherein said sensor includes a mechanical part which is contacted by the person as the person is thrown rearward to activate said sensor.

14. A protection apparatus as claimed in claim 12:

wherein said sensor includes an electronic part which senses an abrupt speed change of the vehicle which occurs when the person is thrown rearward to activate said sensor.

15. A protection apparatus as claimed in claim 11:

wherein said activation means includes
 a cylinder in which a piston is located,
 a pyrotechnical charge located in said cylinder below said piston, and
 a bar attached at one end to said neck support and at the other end to said piston, said bar being moved upwardly when said charge is ignited to move said piston so that said neck support is moved upwardly to stretch said flexible material.

16. A protection apparatus as claimed in claim 15:

wherein said bar also moves said neck support forwardly as said neck support is moved upwardly.

17. A protection apparatus as claimed in claim 15:

wherein said activation means further includes a sensor which ignites said charge, said sensor including a mechanical part which is contacted by the person as the person is thrown rearward to activate said sensor to ignite said charge.

18. A protection apparatus as claimed in claim 15:

wherein said activation means further includes a sensor which ignites said charge, said sensor including an electronic part which senses an abrupt speed change of the vehicle which occurs when the person is thrown rearward to activate said sensor to ignite said charge.

* * * * *